United States Patent [19]

Sakamaki

[11] Patent Number: 5,183,274
[45] Date of Patent: Feb. 2, 1993

[54] CHUCK FOR TOOLS

[75] Inventor: Kazuo Sakamaki, Ojiya, Japan

[73] Assignee: Yukiwa Seiko Kabushikikaisya, Ojiya, Japan

[21] Appl. No.: 841,066

[22] Filed: Feb. 25, 1992

[30] Foreign Application Priority Data

Jun. 13, 1991 [JP] Japan .................. 3-142041

[51] Int. Cl.⁵ .............................. B23B 31/12
[52] U.S. Cl. ................... 279/62; 279/140; 279/902
[58] Field of Search ..................... 279/60-65, 279/140, 902

[56] References Cited

U.S. PATENT DOCUMENTS

| 4,840,387 | 6/1989 | McCarthy | 279/902 X |
| 4,951,955 | 8/1990 | Sakamaki | 279/60 X |
| 5,009,439 | 4/1991 | Sakamaki | 279/62 |

FOREIGN PATENT DOCUMENTS 1-289608 11/1989 Japan .

Primary Examiner—Steven C. Bishop
Attorney, Agent, or Firm—Sughrue, Mion, Zinn, Macpeak & Seas

[57] ABSTRACT

A chuck for a tool is provided, which firmly fastens the working tool and can maintain the fastened state of the tool even when added vibration to be caused during operation. A plurality of jaws are obliquely provided relative to the axis of a chuck body, a grip sleeve is provided close to the rear end portion of the chuck body in unmovably fitted condition relative to the chuck body, a male screw portion is formed on the outer peripheral surface of each jaw, a nut sleeve is rotatably mounted to the chuck body, a female screw portion is provided on the inner peripheral surface of the nut sleeve, a rotational sleeve is provided in axially slidable condition to the chuck body but unrotatably engaged to the said nut sleeve, and the male screw portion and the female screw portion are engaged with each other, and whereby when said rotational sleeve is rotated by hand, the jaws are advanced/retracted to thereby clamp/release the tool. The rotational sleeve is slidably provided in the axial direction of the chuck body; a positioning mechanism for axial sliding movement of the rotational sleeve and a rotation preventing mechanism for preventing the rotational sleeve from rotating are provided; and said positioning mechanism and said rotation preventing mechanism are located at such positions where rotational operation and positioning operation of the rotational sleeve can be done easily by one hand gripping.

15 Claims, 4 Drawing Sheets

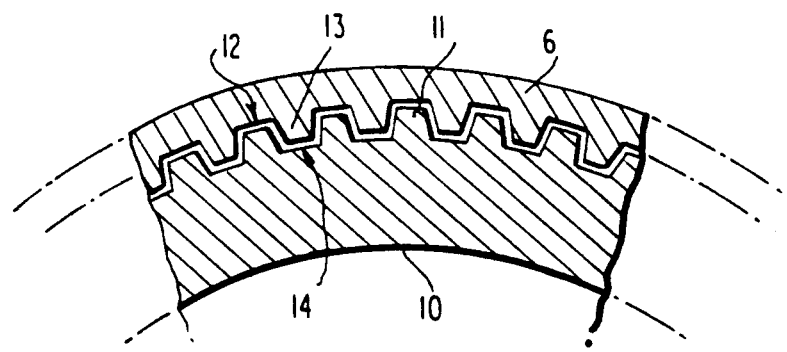
FIG.3
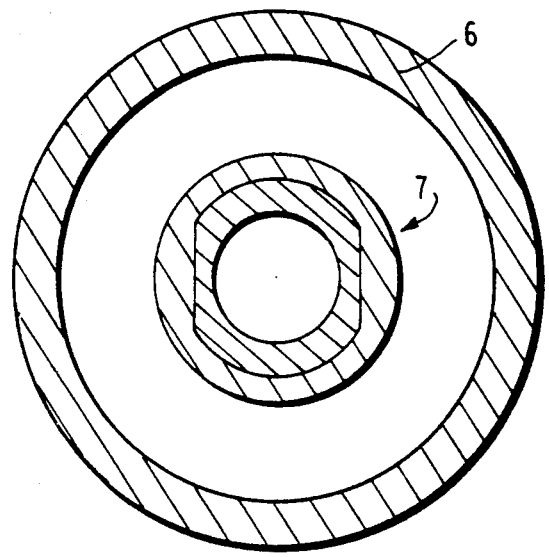
FIG.4
FIG.9 PRIOR ART
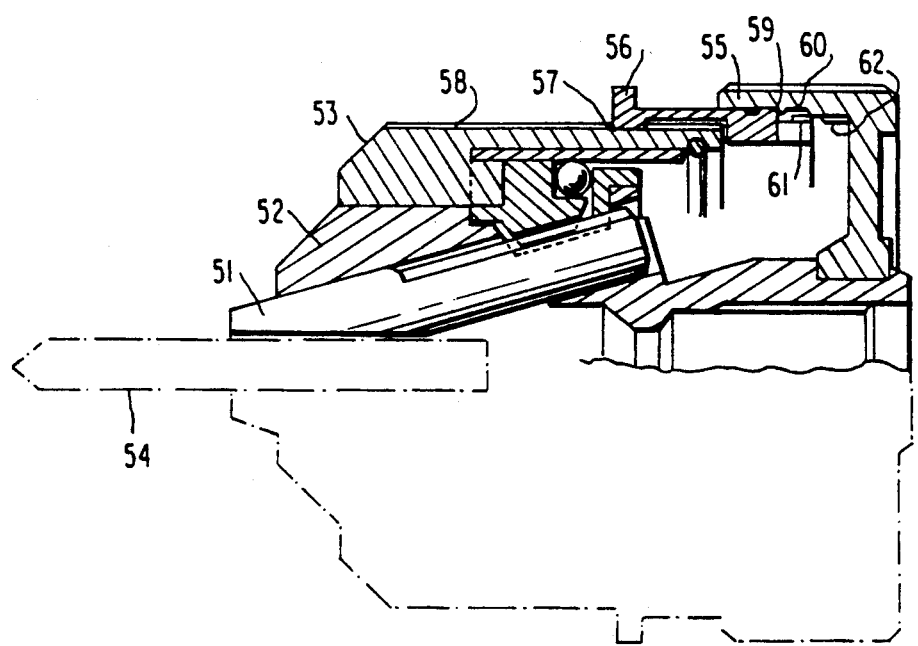

CHUCK FOR TOOLS

BACKGROUND OF THE INVENTION

The present invention relates to a chuck for a tool such as a drill.

The present applicant discloses a chuck in Japanese Patent Application No. 63-119597 (hereinafter referred to as the prior art chuck) as shown in FIG. 9. In the prior art chuck, a buffer stop cylinder 56, which is slidable relative to a rotational sleeve 53 that is not slidable in the axial direction nor rotatable relative to the buffer stop cylinder 56 by engagement of splines 57 with spline grooves 58, is fitted to the rotatable operational sleeve 53. When the buffer stop cylinder 56 is positioned by engaging a convex portion 59, formed on the outer peripheral portion thereof, with a concave portion 60 formed on the inner peripheral surface of a grip sleeve 55, a serration portion 61 formed on the outer rear end portion of the buffer stop cylinder 56 is engaged with a serration portion 62 formed on the inner rear end portion of the grip sleeve 55, whereby the buffer stop cylinder 56 is kept unrotatable relative to the grip sleeve 55, and hence the rotational sleeve 53 is kept unrotatable also relative to the grip sleeve 55, thereby preventing the rotational sleeve 53 from being rotated relative to the chuck body 52 and ensuring the fastening effect of a working tool 54 with jaws 51.

It has been however found through various experiments that the prior art chuck has disadvantages or inconvenience in use. Namely, since the buffer stop cylinder 56 is provided around over the outer peripheral surface of the rotational sleeve 53 which is gripped by a user's hand and on which his palm contacts, it would be inconvenient to carry out the rotational operation of the rotational sleeve 53, and also after the rotational sleeve 53 has been rotated to thereby fasten a working tool 54 with jaws 51, a user has to let go his grip off the rotational sleeve 53 and slide the buffer stop cylinder 56, thus two actions are required on his hand's movement, which reduces the work efficiency.

A primary object of the invention is to provide a chuck for a tool which can overcome the above-noted disadvantages.

SUMMARY OF THE INVENTION

An object of this invention is to eliminate the disadvantages of the prior art chuck for a tool and to provide a chuck for a tool, of which a rotational sleeve can be prevented from being rotated relative to the chuck body even when a buffer stop cylinder is eliminated therefrom. According to the invention, to accomplish this object, there is provided a chuck for a tool, wherein a plurality of jaws are obliquely provided relative to the axis of the chuck body, a grip sleeve is provided close to the rear end portion of the chuck body in unrotatable condition relative to the chuck body, a male screw portion is formed on the outer peripheral surface of each jaw, a nut sleeve is fitted to the chuck body, a female screw portion is provided on the inner peripheral surface of the nut sleeve, and the male screw portion and the female screw portion are engaged with each other, and the rotational sleeve is engaged unrotatably to the nut sleeve and whereby the rotational sleeve is rotated to thereby advance/retract the jaws, the chuck comprising the improvement wherein the rotational sleeve is slidably provided in the axial direction; a positioning mechanism for restricting the rotational sleeve from sliding in the axial direction and a rotation preventing mechanism for preventing the rotational sleeve from rotating are provided; and the positioning mechanism and the rotation preventing mechanism are located at positions where rotational operation of the rotational sleeve is not obstructed by the positioning mechanism and the rotation preventing mechanism.

According to another aspect of the invention, there is provided a chuck for a tool, wherein a plurality of jaws are obliquely provided relative to the axis of the chuck body, a grip sleeve is provided close to the rear end portion of the chuck body in unrotatable condition relative to the chuck body, a male screw portion is formed on the outer peripheral surface of each jaw, a nut sleeve is fitted to the chuck body, a female screw portion is provided on the inner peripheral surface of the nut sleeve, and the male screw portion and the female screw portion are engaged with each other, and the rotational sleeve is engaged unrotatably to the nut sleeve and whereby the rotational sleeve is rotated to thereby advance/retract the jaws, the chuck comprising the improvement wherein the rotational sleeve is slidably provided in the axial direction; a plurality of circumferential concave portions are formed on the inner peripheral surface close to the front end of the rotational sleeve and a ball which is retractable/projectable by a suitable means and engageable with the circumferential concave portions are provided on the outer peripheral surface close to the front end of the chuck body to thereby constitute a positioning mechanism; and a serration is formed on the outer peripheral surface close to the rear end of the rotational sleeve and another serration is formed on the inner peripheral surface close to the front side of the grip sleeve and both serrations are engaging each other to thereby constitute a rotation preventing mechanism.

According to another aspect of the invention there is provided a chuck for a tool, wherein a plurality of jaws are obliquely provided relative to the axis of the chuck body, a grip sleeve is provided close to the rear end portion of the chuck body in unrotatable condition relative to the chuck body, a male screw portion is formed on the outer peripheral surface of each jaw, a nut sleeve is fitted to the chuck body, a female screw portion is provided on the inner peripheral surface of the nut sleeve, and the male screw portion and the female screw potion are engaged with each other, and the rotational sleeve is engaged unrotatably to the nut sleeve and whereby the rotatinal sleeve is rotated to thereby advance/retract the jaws, the chuck comprising the improvement wherein the rotational sleeve is slidably provided in the axial direction; a sleeve is provided close to the rear end of the rotational sleeve; a convex portion is provided on the outer peripheral surface of the sleeve and a concave portion which is engageable with the convex portion is provided on the inner peripheral surface close to the rear end of the grip sleeve; and a serration is provided on the outer peripheral surface close to the rear end of the rotational sleeve, which is engageable with another serration provided on the inner peripheral surface close to the front end of the grip sleeve.

BRIEF DESCRIPTION OF THE DRAWINGS

In the accompanying drawings;

FIG. 3 is a fragmentary sectional view taken on the line A—A of FIG. 2;

FIG. 4 is a cross-sectional view taken on the line B—B of FIG. 2;

FIG. 9 is a fragmentary longitudinal cross-sectional view of a chuck according to the prior art.

DESCRIPTION OF THE PREFERRED EMBODIMENTS

Figure 5:
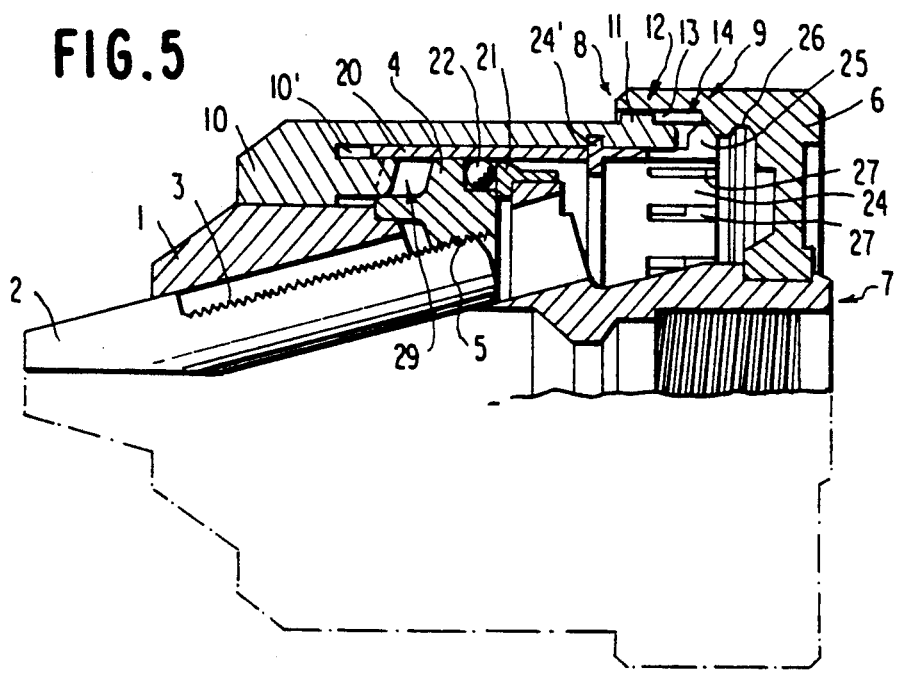
FIG. 5 is a fragmentary longitudinal cross-sectional view of a chuck according to another embodiment of the invention.
Figure 6:
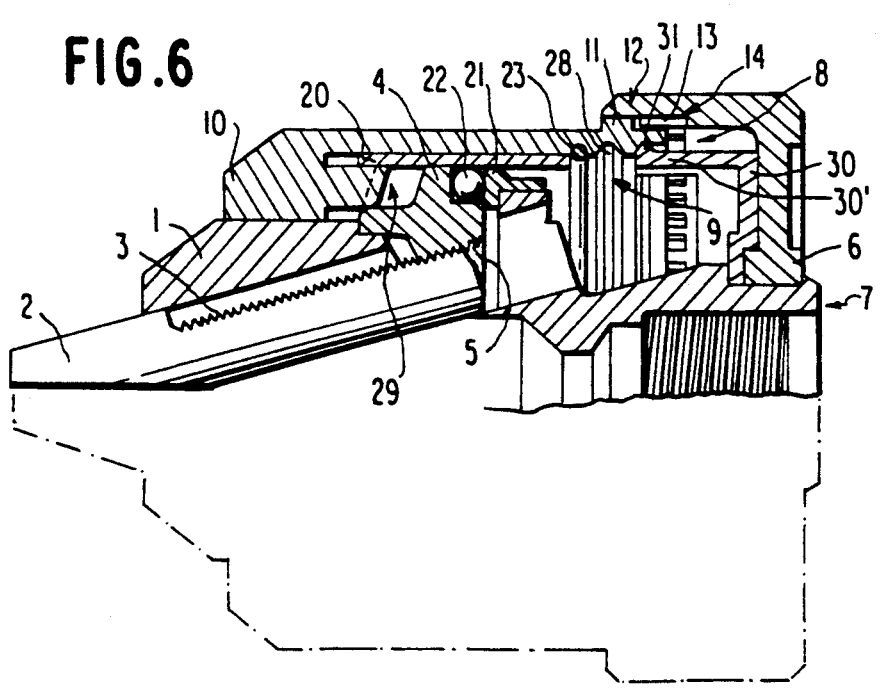
FIG. 6 is a fragmentary longitudinal cross-sectional view of a chuck according to still another embodiment of the invention.
Figure 7:
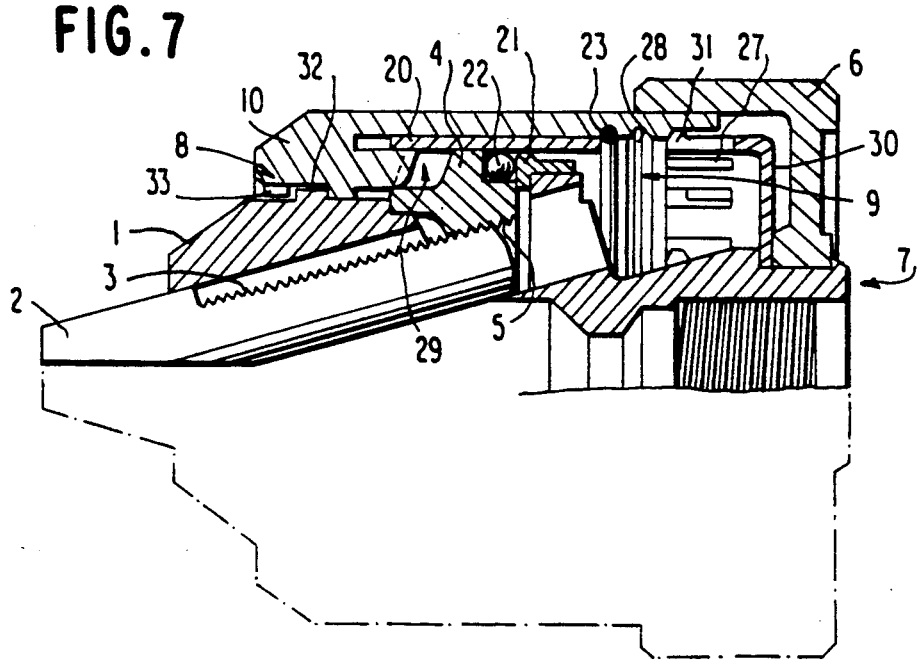
FIG. 7 is a fragmentary longitudinal cross-sectional view of a chuck according to still another embodiment of the invention.
Figure 8:
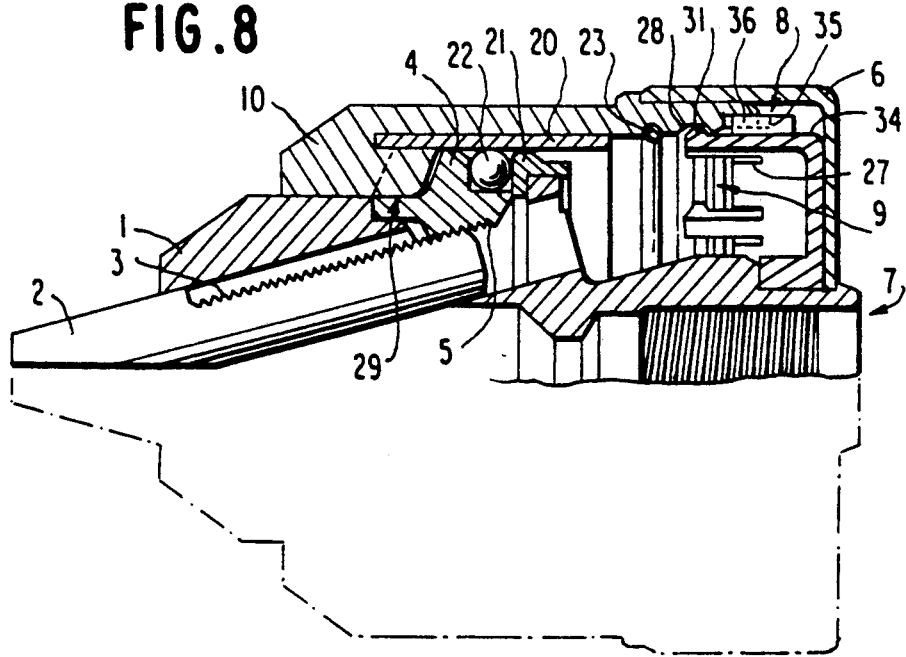
FIG. 8 is a fragmentary longitudinal cross-sectional view of a chuck according to still another embodiment of the invention.

The present invention will now be described with reference to the accompanying drawings which show some of the various embodiments of the invention, in which are shown variety of positions where a rotation preventing mechanism 8 and the positioning mechanism 9 of the axial sliding of a rotational sleeve are located. FIGS. 1 to 4 show a first embodiment in which the rotation preventing mechanism 8 is provided between the rotational sleeve 10 and the grip sleeve 6, and the positioning mechanism 9 is provided between the rotational sleeve 10 and the chuck body 1. FIG. 5 shows another embodiment in which the rotation preventing mechanism 8 and the positioning mechanism 9 are provided between the rotational sleeve 10 and the grip sleeve 6. FIG. 6 shows still another embodiment in which the rotation preventing mechanism 8 is provided between the rotational sleeve 10 and the grip sleeve 6, and the positioning mechanism 9 is provided between the rotational sleeve 10 and a sleeve 30. FIG. 7 shows a fourth embodiment in which the rotation preventing mechanism 8 is provided between the rotational sleeve 10 and the chuck body 1 on the position close to the front end, and the positioning mechanism 9 is provided between the rotational sleeve 10 and the sleeve 30 as similarly to FIG. 6. FIG. 8 shows a fifth embodiment in which the rotation preventing mechanism 8 is provided between the rotational sleeve 10 and the sleeve 34, and the positioning mechanism 9 is provided between the rotational sleeve 10 and the sleeve 34 as similarly to FIG. 6.

The types of the devices according to the invention are classified as described above. However, among these types, there is a common feature that the rotational sleeve 10 can be kept unrotatable relative to a fastening members 7 (corresponding to the chuck body 1 and the grip sleeve 6) and the positioning of the axial slide movement of the rotational sleeve 10 can be done, both by one gripping operation of the rotational sleeve 10, without otherwise required buffer stop cylinder operation for the prior art chuck.

The first embodiment of the invention will now be described.

Radially divided three jaws 2 are slidably and obliquely provided in a chuck body 1. A nut sleeve 4 which is divided for assembly is rotatably mounted on the chuck body 1. A shape retaining hoop 20 is pressingly fitted around the outer peripheral surface of the nut sleeve 4 for retaining a shape of the nut sleeve 4 in a unit. A female screw portion 5 of the nut sleeve 4 is engaged with a male screw portion 3 of the jaws 2.

A concave portion 16 is formed on the outer surface close to the front end portion of the chuck body 1. A spring 18 is provided in the concave portion 16. A ball 17 is disposed in the concave portion 16, the ball 17 partially projecting by the spring 18 to either of a plurality of circumferential concave portions 15 provided on the inner peripheral surface close to the front end of the operational sleeve 10.

The rear end portion of the rotational sleeve 10, which is made of synthetic resin, is inserted into a grip sleeve 6 so as to be axially slidable to the grip sleeve 6, that is, in the axial direction relative to the chuck body 1. A serration 12 having convex portions 11 is provided on the outer peripheral surface of the rear end portion of the rotational sleeve 10.

Reference numeral 21 denotes a bearing seat, numeral 22 denotes a bearing ball, numeral 23 denotes a stop ring, and numeral 29 denotes a engagement portion for transmitting the rotation torque of the rotational sleeve 10 to the nut sleeve 4.

Reference numeral 10' denotes a groove in an axial direction on which the shape retaining hoop 20 is fitted, and the rotational sleeve 10 slides between said groove 10' and said stop ring 23 in the axial direction.

The grip sleeve 6 is fixed to the chuck body 1 under the condition that the grip sleeve 6 is prevented from rotating relative to the chuck body 1. A serration 14 having convex portions 13 is provided on the inner peripheral surface of the front end portion of the grip sleeve 6.

With the above-described arrangement of the first embodiment, when the grip sleeve 6 is gripped by the user's hand and the rotational sleeve 10 is rotated by the other hand, the nut sleeve 4 is rotated. The jaws 2 are obliquely slid forward by the threaded engagement action between the nut sleeve 4 and the jaws 2, clamping tool 19. Also, when the rotational sleeve 10 is rotated in the reverse direction, the jaws 2 are obliquely slid backward, releasing the tool 19.

Figure 1:
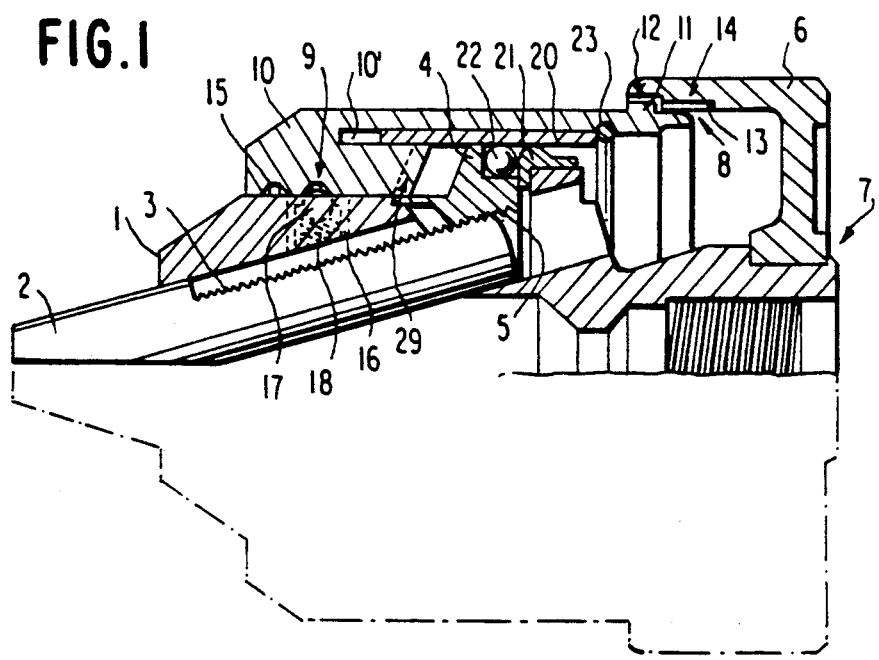
FIG. 1 is a fragmentary longitudinal cross-sectional view of a chuck according to the present invention.
Figure 2:
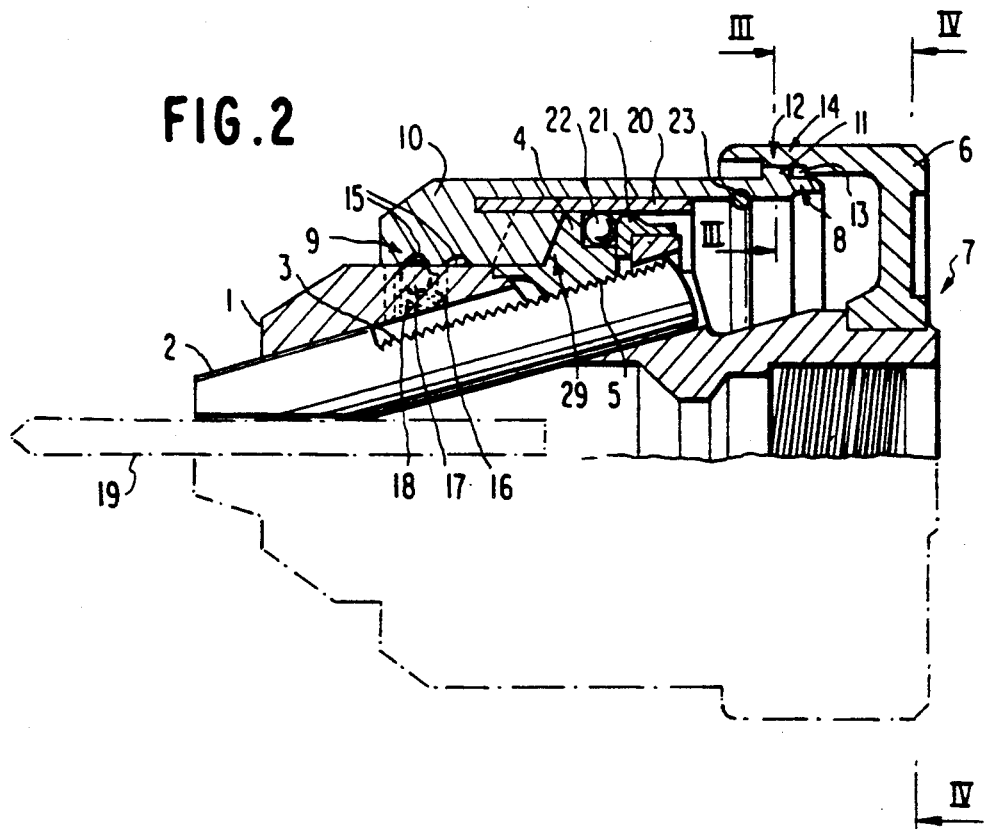
FIG. 2 is a fragmentary longitudinal cross-sectional view of another state of the chuck shown in FIG. 1.

After the tool 19 has been fastened by the fastening rotation of the rotational sleeve 10 and when the rotational sleeve 10 is slid rearward as shown in FIG. 2, the edge of the hoop 20 hits the end of the groove 10' and simultaneously the ball 17 provided in the chuck body 1 projects into the concave portion 15 formed on the inner surface of the front end of the rotational sleeve 10, and at the same time, the serration 12 and the serration 14 are engaged with each other. As a result, the rotational sleeve 10 is positioned in the axial direction relative to the chuck body 1, and the rotational sleeve 10 is kept unrotatable relative to the chuck body 1. Accordingly, it is possible to positively maintain the clamped state of the tool 19 even when some vibration caused in use of the chuck.

If the rotational sleeve 10 is slid forward, the engagement between the serration 12 and the serration 14 is released and the rotational sleeve 10 can be rotated in reverse to thereby release the tool 19, and in this action, the forward positioning of the rotational sleeve 10 is done by the ball 17 to project into the rear side concave 15 and by the hitting of the stop ring 23 to the hoop (20)'s rear end edge.

FIG. 5 shows a second embodiment of the invention, in which a sleeve 24 which is made of synthetic resin, a convex portion 24' of the end portion serves as the stop ring 23, and the backward positioning of the axial slide movement of the rotational sleeve 10 is done by hitting of the hoop(20)'s top edge to the end of the groove 10' as well as engagement of the sleeve(24)'s convex portion 25 into the concave portion 26 formed on the inner peripheral surface of the grip sleeve 6. The rotation preventing mehanism 8 of the second embodiment is the same as that of the first embodiment. Namely, the rotational sleeve 10 is kept unrotatable relative to the chuck body 1 and grip sleeve 6 through the engagement of the serration 12 and the serration 14. The other structures and the associated effects are the same as those of the first embodiment. Slits 27 are formed for the purpose of imparting flexibility to the sleeve 24.

Incidentally, in the second embodiment shown in FIG. 5, the same reference numerals are used to denote the like members and components of the first embodiment.

A third embodiment shown in FIG. 6 has the common feature with the first embodiment in the same meaning. In the third embodiment, a sleeve 30 made of synthetic resin is fixed to the chuck body 1 being clamped between the chuck body 1 and the grip sleeve 6. Convex portions 31 formed at an outer peripheral portions of the ends of projections 30' located at the opposite portions formed on the circumferential edge line of the sleeve 30 are engaged with associated concave portions 28 provided on the inner peripheral surface of the end portion of the rotational sleeve 10 for positioning the axial slide movement of the rotational sleeve 10 relative to the grip sleeve 6, i.e., the chuck body 1. Other associated mechanisms for the positioning of the slide movement of the rotational sleeve are the same as for the first embodiment. And also the structure of the rotation preventing mechanism 8 is the same as that of the first embodiment.

The other structures and effects are the same as those of the first embodiment. Also, in the third embodiment, the same reference numerals are used to denote like members and components of the first embodiment.

FIG. 7 shows a fourth embodiment of the invention, in which the positioning mechanism 9 of the axial slide movement of the rotational sleeve 10 is the same as that of the third embodiment. The rotation preventing mechanism 8 is the same as the other embodiments in structure but is different from that of the other embodiments in position. In the fourth embodiment, a serration 32 is formed on the outer peripheral surface of the front end of the chuck body 1, which engages with a serration 33 formed on the inner peripheral surface of the front end portion of the rotational sleeve 10.

The other structures and effects are the same as those of the first embodiment. Also, in the fourth embodiment, the same reference numerals are used to denote the like members and components as those of the first embodiment.

FIG. 8 shows a fifth embodiment of the invention, in which the positioning mechanism 9 of the axial slide movement of the rotational sleeve 10 is the same as that of the third embodiment. The rotation preventing mechanism 8 is comprised of serrations 35 and 36 engaged each other provided between the rear end portion of the inner peripheral surface of the rotational sleeve 10 and the outer peripheral surface of the sleeve 34.

The other structures and effects are the same as that of the first embodiment, and also in the fifth embodiment, the same referense numerals are used to denote like members and components of the first embodiment.

In the chuck of the foregoing embodiments, the screw pitch of the male screw portion 3 of the jaws 2 and the female screw portion 5 of the nut sleeve 4 is small, and hence, one-pitch axial movement of the jaws 2 is small. However, since the rotational sleeve 10 is rotated by a user's hand, the rotating operation of the rotational sleeve 10 is very easy. Rather, there is a merit that a strong propelling force can be generated because of this small screw pitching.

With the above-described arrangement of the invention, it is possible to provide a chuck for a tool of which tool clamping and releasing operation can be done more easily being compared to the prior art chuck since a buffer stop cylinder 56 doesn't exist (Clamping of a tool 19 is done by gripping and rotating the rotational sleeve 10 to thereby advance the jaws 2, and the rotational sleeve 10 can be slid without changing the gripping to thereby make the rotational sleeve 10 to be unrotatable.), and which can maintain the clamping state of the tool without being loosened by a vibration of the tool during the use.

What is claimed is:

1. A chuck for a tool, wherein a plurality of jaws are obliquely provided relative to the axis of the chuck body, a grip sleeve is provided close to the rear end portion of said chuck body in unrotatable condition relative to said chuck body, a male screw portion is formed on the outer peripheral surface of each jaw, a nut sleeve is fitted to said chuck body, a female screw portion is provided on the inner peripheral surface of said nut sleeve, and said male screw portion and said female screw portion are engaged with each other, and the rotational sleeve is engaged unrotatably to said nut sleeve and whereby said rotational sleeve is rotated to thereby advance/retract said jaws, said chuck comprising the improvement wherein said rotational sleeve is slidably provided in the axial direction; a positioning mechanism for restricting said rotational sleeve from sliding in the axial direction and a rotation preventing mechanism for preventing said rotational sleeve from rotating are provided; and said positioning mechanism and said rotation preventing mechanism are located at positions where rotational operation of said rotational sleeve is not obstructed by said positioning mechanism and said rotation preventing mechanism.

2. A chuck for a tool, wherein a plurality of jaws are obliquely provided relative to the axis of the chuck body, a grip sleeve is provided close to the rear end portion of said chuck body in unrotatable condition relative to said chuck body, a male screw portion is formed on the outer peripheral surface of each jaw, a nut sleeve is fitted to said chuck body, a female screw portion is provided on the inner peripheral surface of said nut sleeve, and said male screw portion and said female screw portion are engaged with each other, and the rotational sleeve is engaged unrotatably to said nut sleeve and whereby said rotational sleeve is rotated to thereby advance/retract said jaws, said chuck comprising the improvment wherein said rotational sleeve is slidably provided in the axial direction; a plurality of circumferential concave portions are formed on the inner peripheral surface close to the front end of said rotational sleeve and a ball which is retractable/projectable by a suitable means and engageable with said circumferential concave portions are provided on the outer peripheral surface close to the front end of said chuck body to thereby constitute a positioning mechanism; and a serration is formed on the outer peripheral surface close to the rear end of said rotational sleeve and another serration is formed on the inner peripheral surface close to the front side of said grip sleeve and both serrations are engaging each other to thereby constitute a rotation preventing mechanism.

3. A chuck for a tool, wherein a plurality of jaws are obliquely provided relative to the axis of the chuck body, a grip sleeve is provided close to the rear end portion of said chuck body in unrotatable condition relative to said chuck body, a male screw portion is formed on the outer peripheral surface of each jaw, a nut sleeve is fitted to said chuck body, a female screw portion is provided on the inner peripheral surface of said nut sleeve, and said male screw portion and said female screw portion are engaged with each other, and the rotational sleeve is engaged unrotatably to said nut sleeve and whereby said rotational sleeve is rotated to thereby advance/retract said jaws, said chuck comprising the improvement wherein said rotational sleeve is slidably provided in the axial direction; a sleeve is provided close to the rear end of said rotational sleeve; a convex portion is provided on the outer peripheral surface of said sleeve and a concave portion which is engageable with said convex portion is provided on the inner peripheral surface close to the rear end of said grip sleeve; and a serration is provided on the outer peripheral surface close to the rear end of said rotational sleeve, which is engageable with another serration provided on the inner peripheral surface close to the front end of said grip sleeve.

4. A chuck for a tool, wherein a plurality of jaws are obliquely provided relative to the axis of the chuck body, a grip sleeve is provided close to the rear end portion of said chuck body in unrotatable condition relative to said chuck body, a male screw portion is formed on the outer peripheral surface of each jaw, a nut sleeve is fitted to said chuck body, a female screw portion is provided on the inner peripheral surface of said nut sleeve, and said male screw portion and said female screw portion are engaged with each other, and the rotational sleeve is engaged unrotatably to said nut sleeve and whereby said rotational sleeve is rotated to thereby advance/retract said jaws, said chuck comprising the improvement wherein said rotational sleeve is slidably provided in the axial direction; a concave portion is provided on the inner peripheral surface close to the rear end of said rotational sleeve, a sleeve is provided close to the front side of said grip sleeve, and a convex portion which is engageable with said concave portion is provided on the outer peripheral surface of said sleeve to thereby constitute a positioning mechanism; and a serration is provided on the outer peripheral surface close to the rear end of said rotational sleeve, which is engageable with another serration provided on the inner peripheral surface close to the front end of said grip sleeve to constitute a rotation preventing mechanism.

5. A chuck for a tool, wherein a plurality of jaws are obliquely provided relative to the axis of the chuck body, a grip sleeve is provided close to the rear end portion of said chuck body in unrotatable condition relative to said chuck body, a male screw portion is formed on the outer peripheral surface of each jaw, a nut sleeve is fitted to said chuck body, a female screw portion is provided on the inner peripheral surface of said nut sleeve, and said male screw portion and said female screw portion are engaged with each other, and the rotational sleeve is engaged unrotatably to said nut sleeve and whereby said rotational sleeve is rotated to thereby advance/retract said jaws, said chuck comprising the improvement wherein said rotational sleeve is slidably provided in the axial direction; a concave portion is provided on the inner peripheral surface close to the rear end of said rotational sleeve, a sleeve is provided close to the front side of said grip sleeve, and a convex portion which is engageable with said concave portion is provided on the outer peripheral surface of said sleeve; and a serration is provided on the inner peripheral surface close to the front end of said rotational sleeve, which is engageable with another serration provided on the outer peripheral surface close to the front end of said chuck body.

6. A chuck for a tool, wherein a plurality of jaws are obliquely provided relative to the axis of the chuck body, a grip sleeve is provided close to the rear end portion of said chuck body in unrotatable condition relative to said chuck body, a male screw portion is formed on the outer peripheral surface of each jaw, a nut sleeve is fitted to said chuck body, a female screw portion is provided on the inner peripheral surface of said nut sleeve, and said male screw portion and said female screw portion are engaged with each other, and the rotational sleeve is engaged unrotatably to said nut sleeve and whereby said rotational sleeve is rotated to thereby advance/retract said jaws, said chuck comprising the improvement wherein said rotational sleeve is slidably provided in the axial direction; a concave portion is provided on the inner peripheral surface close to the rear end of said rotational sleeve, a sleeve is provided close to the front side of said grip sleeve, and a convex portion which is engageable with said concave portion is provided on the outer peripheral surface of said sleeve to thereby constitute a positioning mechanism; and a serration is provided on the inner peripheral surface close to the rear end of said rotational sleeve, which is engageable with another serration provided on the outer peripheral surface of the sleeve to constitute a rotational preventing mechanism.

7. A chuck for a tool, comprising:
a chuck body (1, 7) having a grip sleeve (6) which is gripped by a user's hand;
a chucking means (2) for clamping a tool;
a rotational sleeve means (10) for transmitting a rotational force, applied by the user, to the nut sleeve (4) to advance/retract the chucking means (2), said rotational sleeve means being slidingly movable in the axial direction relative to said chuck body;
a rotation preventing means (12, 14) for preventing said rotation of said rotational sleeve means;
a slide restricting means (15, 17) for restricting the axial sliding movement of said rotational sleeve means.

8. The chuck according to claim 7, wherein said rotation preventing means is not provided in a position where said rotation preventing means obstructs the rotational operation of said rotational sleeve means.

9. The chuck according to claim 7, wherein said slide restricting means is not provided in a position where said slide restricting means obstructs the sliding movement of said rotational sleeve means.

10. The chuck according to claim 8, wherein said rotation preventing means is located between said grip sleeve and said rotational sleeve means.

11. The chuck according to claim 8, wherein said rotation preventing means is located between said chuck body and said rotational sleeve means.

12. The chuck according to claim 8, wherein said rotation preventing means includes a sleeve connected to said grip sleeve, said sleeve having an engagement portion engageable with said rotational sleeve means.

13. The chuck according to claim 9, wherein said slide restricting means includes a ball which is retractable/projectable relative to said chuck body, said ball having an engagement portion engageable with said rotatinal sleeve means.

14. The chuck according to claim 9, wherein said slide restricting means includes a sleeve movable together with said rotational sleeve means, said sleeve having an engagement portion engageable with said grip sleeve.

15. The chuck according to claim 9, wherein said slide restricting means includes a sleeve connected to said grip sleeve, said sleeve having an engagement portion engageable with said rotational sleeve means.

* * * * *

UNITED STATES PATENT AND TRADEMARK OFFICE
CERTIFICATE OF CORRECTION

PATENT NO.  : 5,183,274
DATED       : February 2, 1993
INVENTOR(S) : Kazuo SAKAMAKI It is certified that error appears in the above-indentified patent and that said Letters Patent is hereby corrected as shown below:

Column 3,   line 4,   delete "A-A" and insert
                      --III-III--;

line 6,   delete "B-B" and insert
                      --IV-IV--.

Signed and Sealed this

Fourth Day of January, 1994

Attest:

BRUCE LEHMAN

*Attesting Officer*    *Commissioner of Patents and Trademarks*